Oct. 1, 1968

E. E. FRANCISCO, JR

3,403,544

FLOWMETER CALIBRATION

Filed June 9, 1966

INVENTOR.
EDWARD E. FRANCISCO, JR.
BY
Christie, Parker & Hale
ATTORNEYS.

Oct. 1, 1968  E. E. FRANCISCO, JR  3,403,544
FLOWMETER CALIBRATION

Filed June 9, 1966  6 Sheets-Sheet 5

INVENTOR.
EDWARD E. FRANCISCO, JR.
BY
Christie, Parker & Hale
ATTORNEYS.

Oct. 1, 1968 E. E. FRANCISCO, JR 3,403,544
FLOWMETER CALIBRATION
Filed June 9, 1966 6 Sheets-Sheet 6

INVENTOR.
EDWARD E. FRANCISCO, JR.
BY
Christie, Parker & Hale
ATTORNEYS.

United States Patent Office 3,403,544
Patented Oct. 1, 1968

3,403,544
FLOWMETER CALIBRATION
Edward E. Francisco, Jr., Phoenix, Ariz., assignor to Flow Technology, Inc., Tempe, Ariz., a corporation of Arizona
Filed June 9, 1966, Ser. No. 556,507
17 Claims. (Cl. 73—3)

ABSTRACT OF THE DISCLOSURE

The movement of a piston through a portion of a conduit connected in series with a flowmeter permits the determination of the flowmeter characteristic. Pick-off elements sense the passage of the piston past precisely determined points along the conduit which are proportional to the volume of fluid passing through the flowmeter. A whole number of pulses produced by the flowmeter under test are counted as the piston passes between adjacent pick-off elements. In the piston, two substantially identical magnets are mounted face-to-face so the magnetic fields in them are parallel to the axis of the conduit and oppose each other. Piston stops are located at the ends of the path of the piston. Stops on the piston are shaped so as to trap fluid between their contacting surfaces and brake the speed of the piston. In a prover, a piston bypass is provided with a releasable latch mechanism that releases the piston as the by-pass is smoothly closed. Preferably, a plurality of pistons are adapted to move one at a time within the same portion of the conduit.

---

This invention relates to volumetric flowmeters and, more particularly, to determination of their characteristic.

The nonlinearity of fluid measurement with a flowmeter is a function of the properties of the particular fluid and the flow rate. Thus, to measure the volume of fluid passing through the flowmeter accurately, the characteristic of the flowmeter should be determined with respect to the particular fluid to be used at different flow rates within the range of contemplated operation.

Although flowmeters themselves have been greatly improved in recent years, due chiefly to the development and refinement of turbine-type flowmeters, the techniques for determining the characteristic of these flowmeters, i.e. calibrating these flowmeters, have not kept pace. The same practice of establishing a steady state fluid flow through the flowmeter under test for a long period of time, which was necessary in the past, when flowmeters had long response times and slowly operating mechanical or visual indicators, is still used today to calibrate the fast responding turbine-type flowmeters that instantaneously generate as a digital indication electrical oscillations proportional in number to the volume of fluid passing through the flowmeter. This practice understandably demands a very large volume of test fluid, and, a concomitant expenditure for storage tanks, pumps, and volume-measuring devices with sufficient capacity to accommodate the large volume of test fluid. As a result of the expense involved in such a large volume calibration system, there is a tendency to conduct flowmeter tests only for low rates of fluid flow and to extrapolate the characteristic of the flowmeter under test for higher rates of fluid flow. The expense rises even more if any fluid other than water or an easily manageable hydrocarbon serves as the test fluid. In situations, therefore, where the actual operating fluid is a difficult-to-handle substance, as for example, liquid hydrogen, the cost of calibrating the flowmeter with the actual operating fluid as the test fluid is prohibitive and consequently avoided.

According to the invention, the characteristic of a flowmeter is accurately determined with a piston movable as a fluid barrier through a portion of a conduit. The conduit is connected in series with the flowmeter under test, so the fluid flowing through the conduit also flows through the flowmeter under test. Consequently, the displacement of the piston during a time interval positively represents the fluid passing through the flowmeter under test during the same time interval. Pickoff elements for sensing the passage of the piston are distributed at precisely determined points along the portion of the conduit and the time interval between the passage of the piston by two of the pickoff elements is measured. Preferably, the pickoff elements are unequally spaced. Thus, the amount of fluid displacement that is sensed can be varied according to the flow rate with a minimum of pickoff elements. For high flow rates the sensed fluid displacement is large to improve accuracy of measurement and for low flow rates the sensed fluid displacement is small to reduce the time required to conduct the test.

Responsive to the passage of the piston by one of the pickoff elements, a whole number of cycles of the oscillating electrical signal produced by the digital flowmeter under test are counted and the time interval during which the count of the whole number of cycles takes place is measured. Preferably, the time interval during which the count of the whole number of cycles takes place is made to overlap as much as possible with the time interval between the passage of the piston by the two pickoff elements. This data provides an accurate basis for determining the characteristic of the flowmeter under test with an extremely small amount of test fluid. The high accuracy achieved with a small amount of test fluid is largely due to the fact that a whole number of cycles of the electrical signal produced by the flowmeter under test are counted and the time interval during which the count takes place is measured, as opposed to counting only the number of cycles that are produced during the time interval between the passage of the piston by the two pickoff elements. In the latter case, fractions of a cycle are not taken into account.

The passage of a particular point on the piston by the pickoff elements is extremely accurately sensed by employing in the piston two substantially identically shaped highly coercive permanent magnets. The magnets each have at least one flat face and are magnetized so that the magnetic fields in them with their flat faces in contiguous relationship are parallel to and opposing each other. A piston body surrounds and holds the permanent magnets with their flat faces in contiguous relationship. As a result of this arrangement of permanent magnets, a sharp null in the magnetic field exists at points lying in the plane of the contiguous faces and a rugged piston assembly is achieved. The passage of the null is sensed by a coil serving as the pickoff element, with the aid of a special electric circuit. The voltage generated across the pickoff coil by the passage of the piston actually experiences three zero-crossings, the second or middle one occurring when the null of the magnetic field passes the coil. The direction of the transition in polarity, e.g. positive to negative, of the second zero-crossing is, however, unique. The special electric circuit sensing the direction of this transition generates a pulse at the second zero-crossing. Other arrangements of magnets and coils also produce a sensitive indication of the passage of the piston. According to one such arrangement, a magnet with an internal magnetic field parallel to the axis of the conduit and a pickoff coil wrapped around the conduit and covered by a material with low reluctance are employed.

At the ends of the conduit, piston stops are provided that are so shaped with respect to the piston as to trap fluid between the contacting surfaces of the stop and the piston and brake the speed of the piston prior to impact.

The present invention can be employed to determine the characteristic of a flowmeter in either of two environments. First, the flowmeter can be calibrated by incorporating it in a test setup in the laboratory or in the field. In this case, apparatus is provided to move the piston, and thereby the fluid, through the conduit during test. The test fluid occupies the volume between the piston and the flowmeter, and a propelling fluid different from the test fluid occupies the volume on the other side of the piston. The test fluid and the propelling fluid are at different pressures, thereby causing the piston to move. Second, the flowmeter characteristics can be proved, or verified, while the flowmeter is in actual use in an operational fluid system. In this case, the fluid itself moves the piston. In order to obtain normal unobstructed fluid flow in the latter environment while the piston is at rest, a closable valve is provided to bypass the piston at each end of the portion of conduit through which the piston travels. At the upstream end of the portion of conduit, a releasable latch mechanism, which is coupled to the bypass valve, holds the piston prior to the start of a test run. After releasing the piston latch, the bypass valve is smoothly closed, thereby establishing a smooth transition of fluid flow from the bypass valve to the upstream side of the piston. This smooth transition eliminates excessive perturbation in the fluid flow and allows the piston to reach synchronous motion with the steady state fluid flow within a short length of travel. Thus, the length of the portion of conduit through which the piston travels can be short.

By providing a plurality of pistons, time is saved because a plurality of test runs can first be made and afterward the pistons returned together. At the upstream end one releasable latching mechanism and one closable bypass valve coupled thereto, is provided for each piston.

These and other features of the invention are considered further in the following detailed description taken in conjunction with the drawings, in which:

FIG. 5 is a front elevation view in section of an annular bypass valve employed in the fluid system of FIG. 4;

Figure 1:
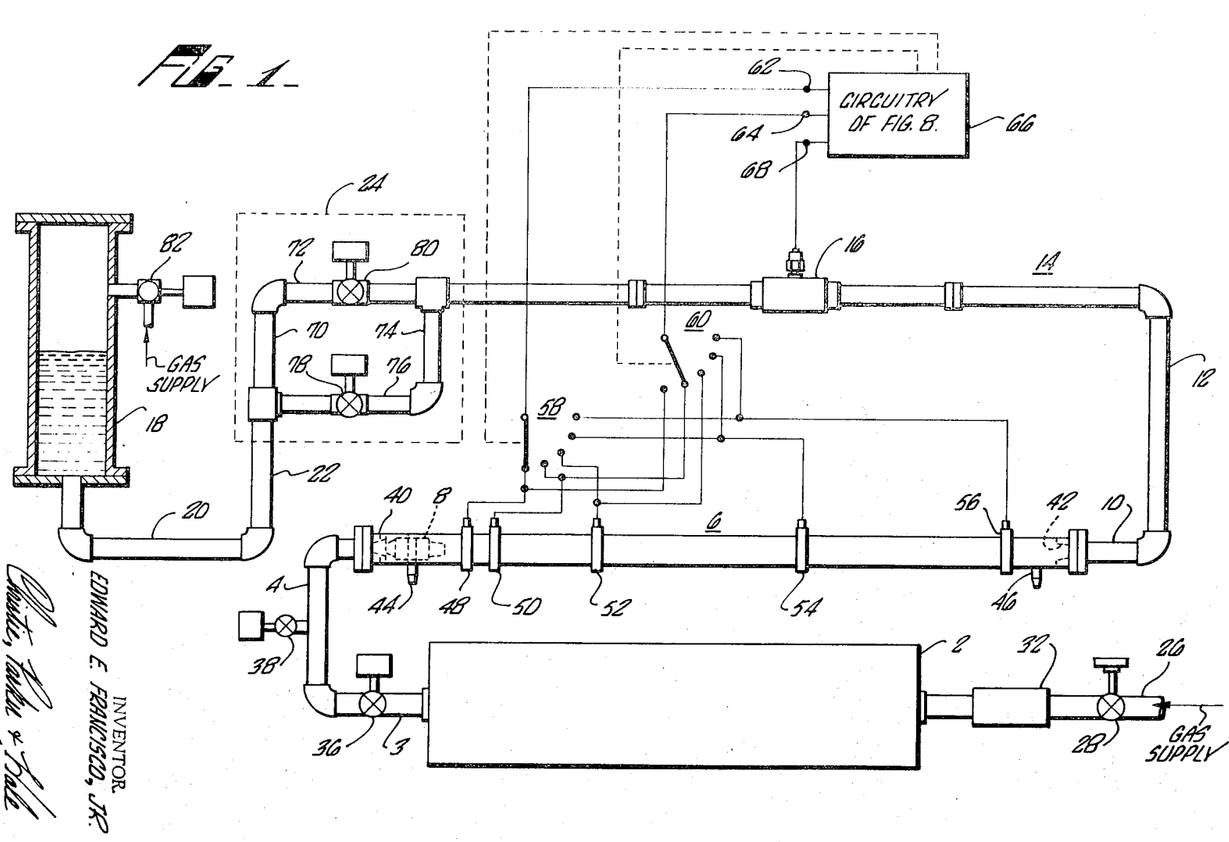
FIG. 1 is a diagram of a test setup employing a piston to calibrate a flowmeter.

In FIG. 1 a test setup for calibrating a flowmeter under test is shown. A tank 2 of gas under pressure is connected by a pipe 4 to a section 6 of conduit through which a piston 8 moves. Section 6 is made of a non-magnetic material such as stainless steel and has a smooth bore to permit easy motion of piston 8 therethrough. Pipes 10 and 12 connect section 6 with a test section 14 of pipe adapted to accept in its path a digital flowmeter 16 under test. A storage tank 18 supplies test fluid to test section 14 through pipes 20, 22, and a flow rate control unit 24. Piston 8 fits tightly inside of section 6, thereby forming a barrier between the gas from tank 2 and the test fluid occupying the space downstream from the piston.

The pressure of the gas in tank 2 is maintained constant to a close tolerance. To this end tank 2 is connected to a supply of gas (not shown) by a pipe 26 having in its path a pressure regulator 32 and a manual shutoff valve 28. A fast-acting solenoid valve 36 in the path of pipe 3 shuts off the supply of gas under pressure to section 6 and a solenoid valve 38 branching off of a pipe 4 provides an escape for the gas under pressure, when it is desired to evacuate the upstream portion of section 6 for piston return.

Section 6 is provided with an upstream piston stop 40 and a downstream piston stop 42, like those discussed subsequently in conjunction with FIGS. 6 and 7. To determine the status, i.e., the position, of piston 8 between test runs, pickoffs 44 and 46 are located at upstream piston stop 40 and downstream piston stop 42, respectively. At very precisely determined points along section 6 pickoff elements 48, 50, 52, 54, and 56 are distributed. These pickoff elements each generate an electrical signal that indicates when a predetermined point of piston 8 passes by them. As described in detail in connection with FIG. 3, a permanent magnet arrangement having a sharp null is built into piston 8. Pickoff elements 48, 50, 52, 54, and 56 are devices that sense the passage of the null of the magnet arrangement. A pickoff element suitable at any temperature is a simple coil producing a voltage proportional to the rate of change of the magnetic field passing through it. Another pickoff element suitable at moderate temperatures is the Hall Generator which, as is well known, generates an electrical voltage proportional to the magnetic field passing through it. Each of pickoff elements 48, 50, 52, 54, and 56 is connected to one terminal of multiterminal switches 58 and 60. The selector arms of switches 58 and 60 are connected to input terminals 62 and 64, respectively, of electrical circuitry, shown as block 66 and described in detail in connection with FIGS. 8 and 9. The circuitry of block 66 processes the test data produced by the test setup. By means of switches 58 and 60, information about the time interval during which piston 8 passes between any two of the pickoff elements distributed along section 6 can be fed to block 66.

Flowmeter 16 under test produces an oscillating electrical signal with a number of cycles dependent upon the volume of fluid passing through it. This electrical signal is applied to terminal 68 of block 66 for processing with the signals generated by the pickoff elements distributed along section 6.

Flow rate control unit 24 comprises a series connection of large pipes 70 and 72 in parallel with a series connection of small pipes 74 and 76. The two parallel branches are not open simultaneously. When the characteristic of flowmeter 16 under test is to be determined at a low flow rate a throttling valve 78 in pipe 76 regulates flow of test fluid through the setup. When the characteristic of flowmeter 16 under test is to be determined at a high flow rate, the flow of test fluid through the setup is regulated by a throttling valve 80 in pipe 72.

The capacity of storage tank 18 is sufficient to accommodate surges in the test fluid level that occur during test. The test fluid in storage tank 18 is maintained under a lower pressure than the pressurized gas in tank 2. A solenoid valve 82 controls the admission of gas from a gas supply (not shown) to storage tank 18 for this purpose.

In operation, piston 8 is at the upstream stop, valve 38 is closed, and valve 36 is closed at the start of a test run. The desired flow rate is first set by adjusting either throttling valve 78 or 80. Valve 36 is then quickly opened to permit the pressurized gas from tank 2 to act directly on the upstream side of piston 8. As piston 8 is pushed downstream through section 6 by the pressurized gas, the test fluid is pushed in synchronism therewith through flowmeter 16 under test and empties into storage tank 18. The test fluid displacement is exactly represented by the displacement of piston 8. After valve 36 is opened, piston 8 initially accelerates until it reaches a speed at which the fluid pressure drop equals the propelling pressure of the gas from tank 2. The flow rate of the test fluid is then stabilized at the value determined by flow rate control unit 24. The length of section 6 which piston 8 traverses before this stabilized condition becomes established is very small. Beyond this point, pickoff elements 48, 50, 52, 54, and 56 are distributed along section 6. After the test run is completed, valve 36 is first closed and valve 38 is then opened allowing the gas to escape from section 6 upstream of piston 8. Consequently, the pressure exerted on the test fluid in tank 18 causes piston 8 to return to stop 40.

It is particularly advantageous to distribute pickoff elements 48, 50, 52, 54, and 56 at unequal intervals of increasing distance, as shown in FIG. 1. At high flow rates it is desirable to conduct tests over a long fluid displacement to improve accuracy. Thus pickoff elements 48 and 54 or 56 would be used. At low flow rates it is desirable to conduct tests over a short fluid displacement to save time. Thus, pickoff elements 48 and 50 or 52 would be used and the procedure to return piston 8 need not be delayed until piston 8 reaches stop 42. It could be initiated immediately after piston 8 passes the appropriate pickoff element (50 or 52).

Figure 2:
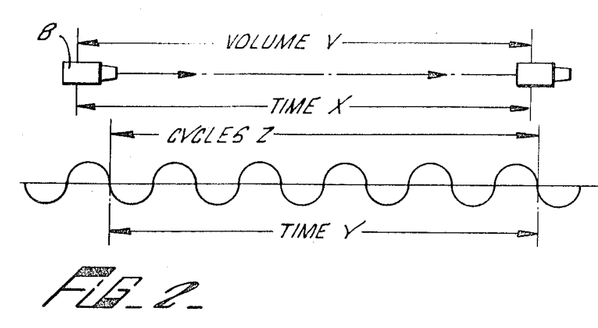
FIG. 2 is a diagram depicting timing considerations in determining the characteristic of a flowmeter by the piston technique.

Reference is now made to FIG. 2, in which some considerations involved in evaluating the test data produced by the piston technique are depicted. As piston 8 moves between two pickoff elements it displaces a known volume V of test fluid. Time interval X, during which volume V of test fluid is displaced, is accurately determined by measuring the time interval between the pulses generated by the corresponding pickoff elements. Ideally, the flowmeter characteristic K is given by the number of cycles produced by flowmeter 16 under test, during the time interval in which volume V is displaced, divided by volume V. In general however, as indicated by FIG. 2, at the beginning and at the end of time interval X, the electrical signal produced by flowmeter 16 may be at any point within its cycle and a whole number of cycles are not in general produced within this time interval. Attempting to count the number of cycles actually produced by flowmeter 16 within time interval X, would, therefore, result in a count that ignores fractions of cycles, and an uncertainty of one cycle would ensue. To avoid this uncertainty, the cycles of the electrical signal produced by flowmeter 16 are counted starting with the beginning of the first cycle occurring after the beginning of time interval X and stopping at the end of the cycle occurring immediately after the end of time interval X. Thus, a whole number of cycles Z are counted, and fractions of cycles are not lost. The time interval Y is measured, during which the whole number of cycles Z are counted. The volume of test fluid represented by Z cycles of flowmeter 16 is in general slightly more or less than the volume V. Precisely, it is different from volume V by the factor $Y/X$, assuming a constant rate of flow during time intervals Y and X. Thus, the flowmeter characteristic, as defined in this specification, is the quotient of the number of cycles counted divided by the volume of fluid causing this number of cycles, i.e.

$$K = ZX/VY$$

Since time interval Y overlaps almost entirely with time interval X, there is high assurance that the whole number of cycles Z are counted at the same rate of flow as that while piston 8 is traveling between the two pickoff elements. If external measures are taken to insure constant rate of flow, time interval Y need not overlap with time interval X, but must in any case bear a predetermined time relationship thereto.

By using the described piston technique to determine the characteristic of a flowmeter, the need for large quantities of test fluid is obviated. In one test setup employing as section 6 a cylinder having a 1¼ inch inside diameter, for example, the total amount of test liquid required for the entire system is about two gallons and the test liquid displaced during test is 0.25 gallon. This setup permits determination of the characteristic of a flowmeter at flow rates ranging between 0.01 and 60 gallons per minute. With other test setups larger test flow rates are possible. Due to the small amount of test fluid required, any fluid is practicable for use as the test fluid by use of appropriate materials of construction and the flow meter can therefore be calibrated for each fluid that it may be called on to measure in an operational system.

Figure 3:
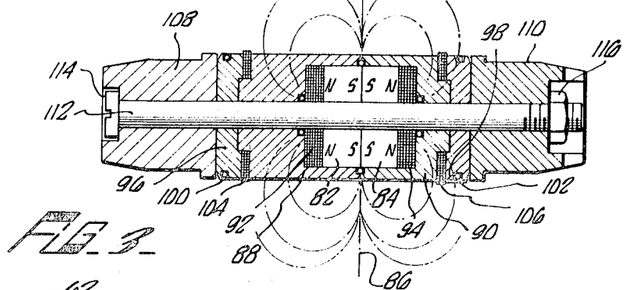
FIG. 3 is a side elevation view in section of the piston used in the test setup of FIG. 1.

In FIG. 3 the construction of piston 8 is shown. Disc-shaped permanent magnets 82 and 84 having high coercivity and being magnetized so that the magnetic fields in them are parallel to the disc axis are placed in contiguous relationship with their magnetic fields opposing each other. In other words, like magnetic poles of magnets 82 and 84 are adjacent each other, as shown in FIG. 3. Lines of equal magnetic field intensity are shown dashed in FIG. 3. The external magnetic field produced by magnets 82 and 84 has a null at a plane 86 of their contiguous faces and increases sharply on either side of plane 86. As a result, a very exact determination of the point in time at which the piston passes a pickoff element is possible. The pickoff element could be a simple coil oriented with its axis perpendicular to the axis of section 6 (FIG. 1). Moreover, the magnets of this arrangement are not susceptible to easy breakage in use. By way of example, magnets 82 and 84 could be made of Alnico 5. The piston housing for magnets 82 and 84 comprises in part sections 88 and 90 having recesses into which magnets 82 and 84 fit, separated from sections 88 and 90 by spacers 92 and 94, respectively. Magnets 82 and 84 are sealed from the fluid by O-rings. Adjacent to sections 88 and 90, respectively, are discs 96 and 98, respectively, that hold annular seals 100 and 102, respectively. Seals 100 and 102 establish a tight fit between the piston and the inside wall of the conduit in which the piston moves. Recessed between disc 96 and section 88 is an annular piston rider 104 and recessed between disc 98 and section 90 is an annular piston rider 106. Finally, an end section 108 has a flange that comes in contact with the upstream piston stop and an end section 110 has a flange that comes in contact with the downstream piston stop. The entire assembly is held together by a connection rod 112 having an integral head 114 at one end and a fastener 116 at the other end. To prevent disturbance with the magnetic field produced by magnets 82 and 84, the other elements are fabricated from nonmagnetic material.

Figure 4:
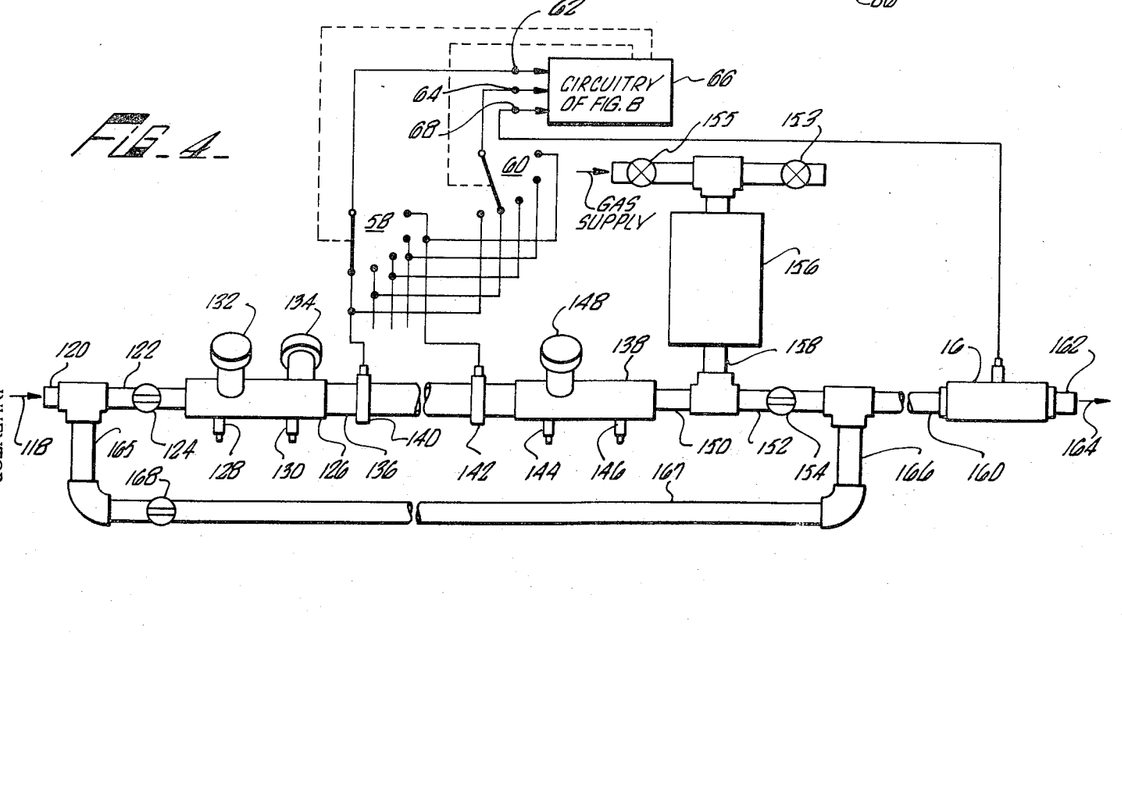
FIG. 4 is a diagram illustrating an operational fluid system in which a piston is employed to prove a flowmeter during actual use.

In FIG. 4 the piston technique is employed to verify or prove the characteristic of a flowmeter during actual use in an operational fluid system. Fluid in the system flows through a pipe 120 in the direction of an arrow 118. A pipe 122 having a ball valve 124 connects pipe 120 with an upstream bypass chamber 126 shown in detail in FIG. 6. Upstream bypass chamber 126 can accommodate two pistons, the presence of which are magnetically sensed by piston status pickoff elements 128 and 130, respectively, and has piston stops. When upstream bypass chamber 126 is occupied by one or both pistons the pistons are held by releasable latches and normal fluid flow is maintained via bypass passages. Elements 132 and 134 represent the housings of actuating mechanisms that individually close valves to block the bypass passages and release the piston latches in a single coordinated operation, the details of which are explained in connection with FIG. 5. As in the calibration test setup of FIG. 1, a section 136 of conduit having a smooth bore and made of nonmagnetic material such as stainless steel, serves to guide the motion of the pistons between upstream bypass chamber 126 and a downstream bypass chamber 138. Each piston flows through section 136 in synchronism with the flow of fluid through the system. A number of pickoff elements, such as elements 140 and 142, are distributed at precisely determined, preferably unequally spaced points along the length of section 136 to sense the passage of a piston. As in the case of the calibration test setup of FIG. 1, this information is fed to input terminals 62 and 64 of the electrical circuitry of block 66.

Downstream bypass chamber 138 also accommodates both pistons, the presence of which are sensed by piston status pickoff elements 144 and 146, respectively. As shown in detail in FIG. 7, downstream bypass chamber 138 contains a piston stop, a bypass passage through which fluid may continue to flow uninterrupted, when chamber 138 is occupied by one or both pistons, and a valve to block the bypass passage. Element 148 represents the housing of the actuating mechanism for the valve of downstream bypass chamber 138. A pipe 150 connects downstream bypass chamber 138 to a pipe 152 having a ball valve 154. A storage tank 156 is connected to the junction of pipes 150 and 152 by a pipe 158. A pipe 160 connects pipe 152 to flowmeter 16 under test. As in the case of the calibration test setup of FIG. 1, the electrical signal produced by flowmeter 16 is applied to input terminal 68 of the electrical circuitry of block 66. After passage through flowmeter 16, the fluid continues through a pipe 162 in the direction of arrow 164 to the remainder of the operational fluid system. A parallel bypass path comprises a pipe 165, a pipe 166, and a pipe 167 all connected in series between the junction of pipes 120 and 122 and the junction of pipes 152 and 160.

In operation, the two pistons initially occupy upstream bypass chamber 126, switches 58 and 60 are set to the desired position, and a bleeder valve 153 is opened. As a result, tank 156 fills up slowly with the fluid flowing through the system. The pistons are unlatched one at a time and move through section 136 to downstream chamber 138 yielding the same test data as the test setup of FIG. 1, which is processed by the circuitry of block 66 in the same manner to prove the characteristic of flowmeter 16. After both pistons occupy downstream chamber 138, their return to upstream bypass chamber 126 is prepared by closing bleeder valve 153, the bypass valve in downstream bypass chamber 138, both bypass valves in upstream bypass chamber 126, and ball valve 154. At this point a valve 155 connecting the top of tank 156 to a supply of inert gas under pressure (not shown) is opened. The pressure upon the surface of the fluid in tank 156 forces the fluid stored in tank 156 to move through pipes 158 and 150 into downstream bypass chamber 138. The only path left open to the fluid from tank 156 is upstream behind the pistons in downstream bypass chamber 138. As a result, the pistons are driven upstream through section 136 into upstream bypass chamber 126, in which they are latched once again, ready for another test run. Ball valve 154 and the bypass valves in chambers 126 and 138 are opened again and valve 155 is closed again, after which another test run can be made.

Figure 6:
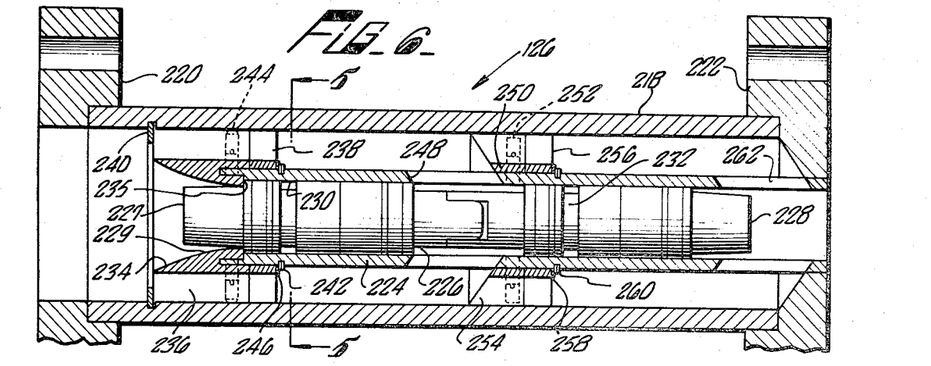
FIG. 6 is a side elevation view in section of the upstream bypass chamber in the fluid system of FIG. 4.

Reference is now made to FIG. 6, in which the details of upstream bypass chamber 126 of FIG. 4 are shown. Chamber 126 comprises a main body 218 having connection flanges 220 and 222 at its ends. Inside of body 218 is a tube 224 which is an extension of section 136 of FIG. 4. Pistons 226 and 228 are of the same general construction as the piston described in connection with FIG. 3 except for annular grooves 230 and 232 and changes in shape of their adjoining ends, which are desgined to cushion the impact between them. annular grooves 230 and 232 each engage a latching bar (shown in FIG. 5), to hold piston 226 and 228, respectively.

The outside surface of tube 224 and the inside surface of body 218 define a bypass passage through which fluid flows when pistons 226 and/or 228 occupy upstream chamber 126. An annular member 234 at the entrance to upstream chamber 126 has a plurality of slots such as 236 through which fluid flows into the bypass passage and serves as a stop for piston 226 upon return from the downstream bypass chamber after a test run. The stop is shaped with respect to the adjoining end of piston 226 such that the impact is cushioned. Basically, after a nose 227 of piston 226 passes through an entrance passage 229 of member 234 during return from downstream chamber 138, further fluid flow through passage 229 is impeded and fluid becomes, so to speak, trapped between an annular surface 235 and piston 226. Consequently this trapped fluid sharply brakes the speed of piston 226 before impact. Through the same principle, piston 8 of FIG. 1 and the adjoining ends of pistons 226 and 228 are cushioned upon impact.

Abutting member 234 is an annular valve 238 which has slots coinciding with the slots of member 234 and is rotatable into and out of alignment with the slots of member 234 by means described in detail in connection with FIG. 5. Member 234 is fastened to tube 224 by several screws such as 244. A retaining ring 240 abuts member 234 and a valve washer 246 separates a retaining ring 242 from annular valve 238. Similarly, an annular member 250 has a plurality of slots such as 254, through which fluid flows into the forward portion of the bypass passage. Abutting member 250 is an annular valve 256 that has slots coinciding with the slots of member 250 and is rotatable into and out of alignment with the slots of member 250. Member 250 is fastened to tube 224 by several screws such as 252 and a retaining ring 260 is separated from annular valve 256, which it secures, by a valve washer 258.

When pistons 226 and 228 occupy tube 224, the slots of member 234 and valve 238 are in alignment and the slots of member 250 and valve 256 are in alignment. Fluid flows through the entire bypass passage and into tube 224 through slots therein such as 262. Upon release of piston 228 the slots of valve 256 are rotated out of alignment with the slots of member 250. Further, fluid flow through the forward portion of the bypass passage is blocked and diverted instead into tube 224 through slots therein such as 248 at about the middle of tube 224. The sequence is such that piston 228 is first released and valve 256 is then smoothly closed so that the transfer from the forward part of the bypass passage to the slots such as 248 in tube 224 and the acceleration of piston 228 to synchronization with the fluid flow in the system take place smoothly. As a result, the proturbation created in the fluid flow can be maintained very small by regulating the speed with which valve 256 is closed.

Similarly, upon release of piston 226 the slots of valve 238 are rotated out of alignment with the slots of member 234. Further fluid flow through the back portion of the bypass passage is blocked and diverted instead into tube 224 through its entrance. As a result, piston 226 smoothly accelerates until it is moving in synchronism with the fluid.

The mechanism for releasing the pistons and rotating the valves is omitted from FIG. 6, but is fully shown in FIG. 5, described subsequently.

Figure 7:
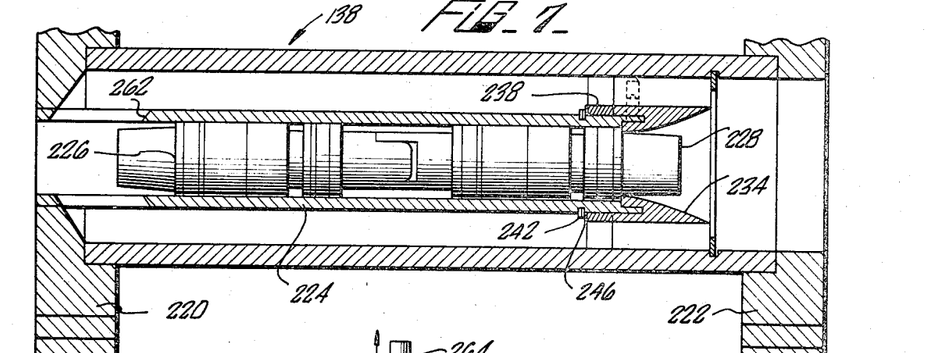
FIG. 7 is a side elevation view in section of the downstream bypass chamber in the fluid system of FIG. 4.

FIG. 7 illustrates the details of downstream bypass chamber 138 which is a mirror image of upstream chamber 126 except that only one annular member, annular valve, and set of slots in tube 224 are provided, thus eliminating the set of slots in tube 224 including 248, member 250, and valve 256. Latching bars for the pistons are also unnecessary.

The chambers of FIGS. 6 and 7 can be expanded to accommodate any number of pistons thereby further reducing the frequency with which the piston return operation must be repeated during a test.

In FIG. 5, which shows upstream bypass chamber 126 in cross section, annular valve 238 and chamber 234 are illustrated together with the corresponding mechanism for moving annular valve 238 and for latching piston 226. An arm 264 actuated by means not shown, which provide a positive actuating force independent of the flow rate or character of the fluid, is connected to a latching lever 266 having a cutout area 268 and an opening 270 within which a pawl 265 rides along a patch shown by arc 267. Pawl 265 links lever 266 to valve 238. As shown in FIG. 5, piston 226 is unlatched, clearing lever 266 by virtue of cutout area 268, and slots 272a, 272b, 272c, 272d of annular valve 238 are out of alignment with corresponding slots 236a, 236b, 236c, and 236d of annular member 234, thereby blocking the bypass passage. A chordal groove 274 in tube 224 permits lever 266 to engage annular groove 230 in piston 226 when arm 264 is lowered. A housing 276 through which arm 264 moves is attached to body 218. At the end of housing 276, a seal 278, a bushing 280, and a cap 282 are provided. Annular valve 256, annular member 250, and the mechanism for moving valve 256 and unlatching piston 228 are identical to the arrangement of FIG. 5.

Figure 8:
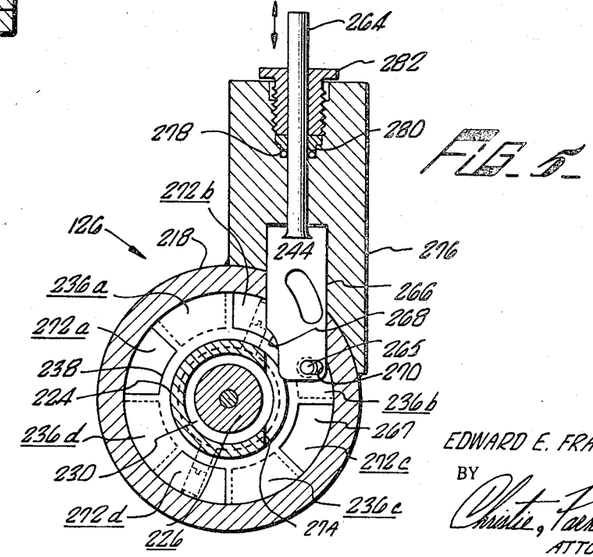
FIG. 8 is a schematic diagram in block form of the electrical circuitry that processes the test data produced by the apparatus of FIG. 1 and FIG. 3.
Figure 9:
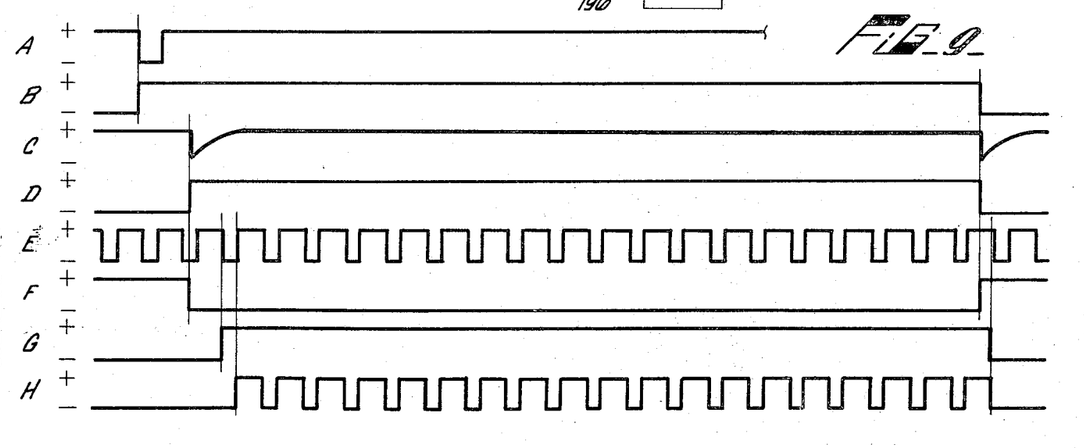
FIG. 9 is a waveform diagram showing the timing sequence of the operations taking place in the circuitry of FIG. 8.

In FIG. 8 the electrical circuitry for processing the test data appearing at terminals 62, 64, and 68 is shown in detail and in FIG. 9 pulse waveforms generated in the circuitry of FIG. 8 during the processing of the test data are shown. The letters A through H are used in FIG. 9 to designate the various waveforms and in FIG. 8 to designate the points in the circuit where the corresponding waveforms of FIG. 9 appear. Immediately before the test is started, the negative going leading edge of a reset pulse, shown as waveform A, prepares a flip flop 170 by placing it in the beginning state and insures that flip flops 172 and 174 are also in the beginning state. Under the term flip flop a bistable multivibrator is to be understood. Counters 200, 204, and 208 are also reset at this time. The time-spaced signals generated by the two pickoff elements connected through switches 58 and 60 to terminal 62 and 64, respectively, are applied to clipping amplifiers 171 and 173, respectively. The outputs of amplifiers 171 and 173 are applied to a special circuit 184 which as explained further in connection with FIG. 10, produces a single pulse each time the null of the magnetic flux of the piston passes one of the pickoff elements connected to terminals 62 and 64. The output of circuit 184, which is waveform C, is applied to the input of an AND circuit 186 along with the output of flip flop 170, which is waveform B. The passage of the null of the magnetic flux of the piston by the first pickoff element causes waveform C to drop to zero. As a result, the output of AND circuit 186, which is connected to both input terminals of flip flop 172, also drops to zero. The negative going leading edge at the output of AND circuit 186 changes the state of flip flop 172. Output terminal 188 of flip flop 172 thus becomes positive and output terminal 178 becomes zero.

Output terminal 188 is connected to one input of an AND circuit 206, to the input of which pulses from a source 202 of clock pulses are applied. Normally the repetition rate of the clock pulses is several orders of magnitude larger than the frequency of the flowmeter output and is very stable. When the voltage at output terminal 188 becomes positive, as indicated by waveform D, the clock pulses from source 202 are gated through AND circuit 206 to counter 208.

The electrical signal produced by the flowmeter under test is applied to input terminal 68, after which it is shaped and amplified by a Schmitt trigger 190. The resulting signal, waveform E, is applied to one input of each of AND circuits 192 and 194. The output of flip flop 172 appearing at terminal 188 is applied to the other input of AND circuit 192 and the output of flip flop 172 appearing at terminal 174 is applied to the other input of AND circuit 194. The outputs of AND circuits 192 and 194 are applied respectively to the two inputs of flip flop 174.

Prior to the first negative going leading edge of waveform C, the positive voltage at output terminal 178 gates waveform E through AND circuit 194. The initial state of flip flop 174 is such that these pulses do not trigger it and a zero voltage appears at output terminal 180, as represented by waveform G. After the first negative going leading edge of waveform C, the voltage at output terminal 188 of flip flop 172 becomes positive, as indicated by waveform D, and waveform E is thereafter gated through AND circuit 192. The first negative going trailing edge of waveform E gated through AND circuit 192 triggers flip flop 174 into a state that is not affected by subsequent changes in waveform E. After flip flop 174 changes state, the voltage at output terminal 180 becomes positive, as indicated by waveform G. This positive voltage is applied to one input of an AND circuit 196, and starts to gate waveform E, which is applied to the other input of AND circuit 196, to counter 200. It is also applied to one input of an AND circuit 198 and starts simultaneously to gate clock pulses from source 202, which are applied to the other input of AND circuit 198, to counter 204.

Counters 200, 204, and 208 continue to count until the passage of the null of the magnetic flux of the piston by the second pickoff element causes waveform C to drop to zero a second time. At this point the voltage appearing at the input of AND circuit 186 becomes zero and AND circuit 186 closes. The negative going leading edge thereby resulting at the output of AND circuit 186 triggers flip flop 172 into a change of state. Thus, the voltage at output terminal 188, as indicated by waveform D, drops to zero and the voltage at output terminal 178 becomes positive, as indicated by waveform F. The change in voltage at output terminal 188 resets flip flop 170, as indicated by waveform B, and results in closure of AND circuit 206 thereby terminating the count in counter 208. The roles of AND circuits 192 and 194 become reversed, waveform E being gated through AND circuit 194 and AND circuit 192 being closed. Upon the appearance of the first negative going pulse edge of waveform E after the negative going leading edge of the second pulse of waveform C, flip flop 174 changes state and the voltage at terminal 180 drops to zero, as indicated by waveform G. At this point AND circuits 196 and 198 close simultaneously and counters 200 and 204 stop counting. The characteristic K of the flowmeter under test for the run described can be computed manually using the time interval X registered on counter 208, the time interval Y registered on counter 204, the number of cycles Z registered on counter 200, and the known volume V of fluid displaced in the time interval X, which depends upon which two pickoff elements were employed in the particular run. Alternatively, the characteristic of the flowmeter can be calculated automatically by a computer 210. In this case, a voltage representative of the volume of test fluid displaced in the particular run is produced by a voltage generator 212 and applied to computer 210 with the test data from counters 200, 204, and 208.

A multiposition switch 214 and switch 58 (FIG. 1 or FIG. 4) are ganged to operate together and a multiposition switch 216 and switch 60 (FIG. 1 or FIG. 4) are ganged to operate together. Each position of switch 214 or 216 closes a circuit producing a voltage proportional to the distance of the pickoff element to which the switch position corresponds from a common origin, for example, upstream piston stop 40 in FIG. 1. The voltage actually applied to computer 210 is then the difference between the voltages produced by switches 214 and 216.

Figures 10, 11:
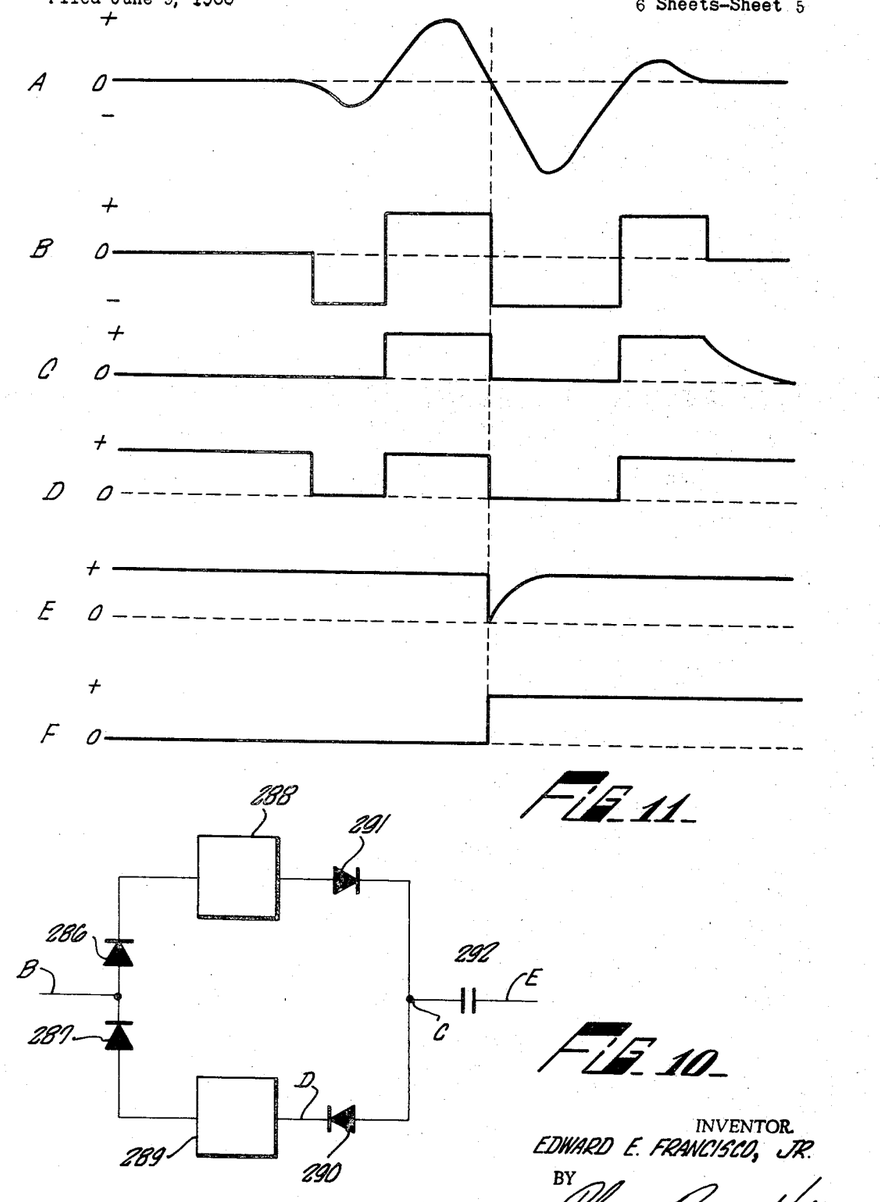
FIG. 10 is a schematic diagram partially in block form of the special electric circuit for sensing passage of the piston.
FIG. 11 is a waveform diagram showing the timing sequence occurring in the circuit of FIG. 10.

In FIG. 10 the special circuit represented in FIG. 8 as block 184 is shown in more detail and in FIG. 11 waveforms arising in the circuit of FIG. 10 during operation are shown. The letters A through F are used in FIG. 11 to designate the various waveforms and in FIG. 10 to designate the points in the circuit where the corresponding waveforms of FIG. 11 appear. Waveform A in FIG. 11 represents the voltage generated across the pickoff coil. Waveform A has three zero crossings, only one of which, the middle or second one, is to be sensed. The direction of the transition of the middle zero-crossing, i.e. positive to negative, is different from the direction of the transition of the first and third zero crossing, i.e. negative and positive. The special circuit of FIG. 10 senses the zero crossing with the unique direction of transition which occurs at the instant that plane 86 of the piston (FIG. 3) crosses the center of the pickoff coil. Waveform A generated by the pickoff coil is applied to clipping amplifier 171 or 173 (FIG. 8), the output of which is represented by waveform B. Waveform B is split by diodes 286 and 287, the positive portions being directed through the upper branch of the special circuit and the negative portions being directed through the lower branch. The positive portions of waveform B are transmitted through a driver circuit 288, which could comprise a transistor switch with appropriate terminal impedances, and a diode 291, as shown by waveform C. As a result, a capacitor 292, which constitutes one input of AND circuit 186 (FIG. 8), is charged.

The negative portions of waveform B are applied to the input of a Schmitt trigger 289, whose output then becomes grounded. When Schmitt trigger 289 becomes grounded while capacitor 292 is positively charged from the positive portions of waveform B, a diode 290 connecting the output of Schmitt trigger 289 to capacitor 292 becomes forward biased and the voltage at the junction of diodes 290 and 291 also drops to ground. The sudden drop in the voltage shown by waveform C is transmitted through capacitor 292, because the voltage across it is not able to change quickly and appears as a pulse shown in waveform E. When Schmitt trigger 289 becomes grounded while capacitor 292 is discharged, the voltage at the junction of diodes 290 and 291 does not change substantially since it is already near ground potential, as shown by waveform C. Thus, after the first positive portion of waveform B a pulse is generated. But after the second positive portion of waveform B no pulse is generated, because no negative portion follows, until the next passage of a piston by a pickoff coil. This occurs after capacitor 292 is discharged. In the described manner the zero-cross with the positive to negative transition is sensed, while the zero-crossings with the negative to positive transition are ignored. The sharp pulse transmitted through capacitor 292 triggers flip flop 172 (FIG. 8), represented by waveform F, into a change of state.

Figure 12A:
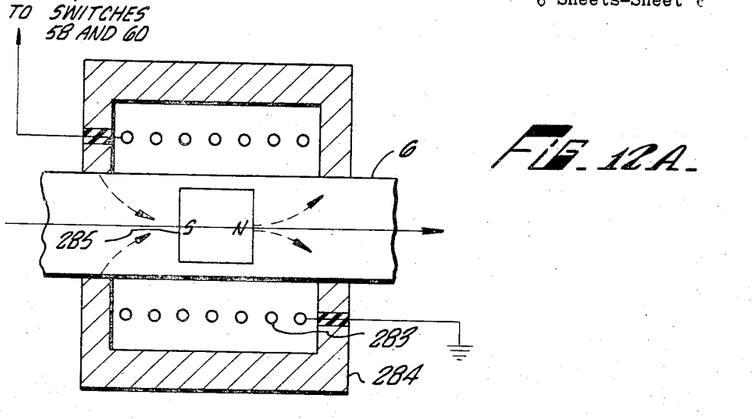
FIGS. 12A–12C show in section alternative arrangements of magnets and pickoff coils that accurately sense the passage of the piston during test.
Figure 12B:
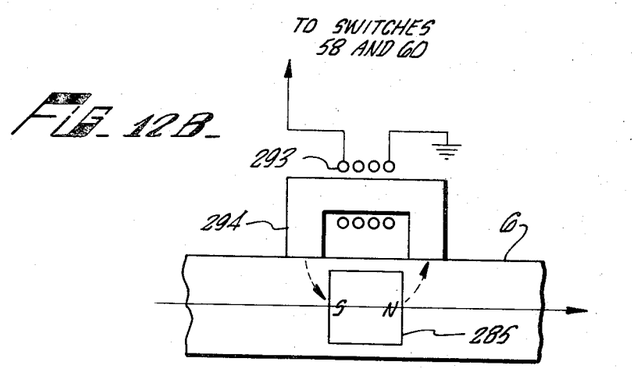
Figure 12C:
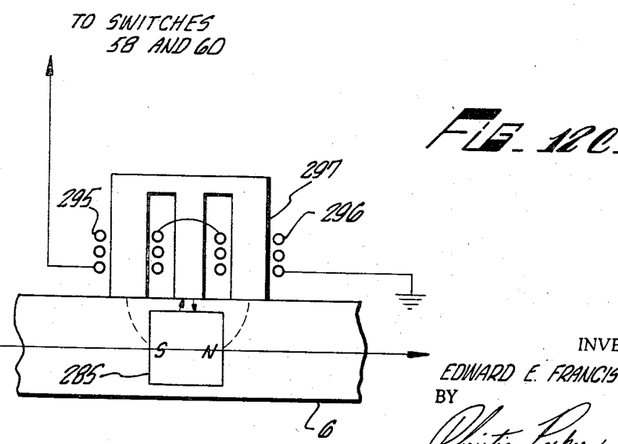

Arrangements other than the two magnets shown in FIG. 3 can be employed to sense passage of a piston accurately. One such arrangement employing a single permanent magnet 285 with an internal magnetic field parallel to the axis of section 6 is illustrated in FIGS. 12A, 12B, and 12C with different types of pickoff elements. The piston housing is omitted for simplicity and the magnetic field is represented by dashed lines. In FIG. 12A, a coil 283 is wrapped around section 6 and a hollow, low reluctance jacket 284 surrounds coil 283. As magnet 285 moves past jacket 284, it becomes part of the flux path for magnet 285 and induces a voltage across coil 283 that crosses zero when magnet 285 is centered within coil 283. In the arrangement of FIG. 12B a voltage with a zero crossing is similarly generated across a coil 293 wrapped around a U-shaped, low reluctance member 294, when magnet 285 passes. FIG. 12C illustrates an M-shaped, low reluctance member 297 with a coil 295 wrapped around one end arm and a coil 296 wrapped around the other end arm. A voltage having a zero crossing when magnet 285 is centered between the end arms of member 297 is generated across coils 295 and 296 in series. Passage of the piston could also be sensed by employing the magnet arrangement of FIG. 3 and a magnetic reed switch to sense the passage of the null of the magnetic field or by employing a disc-shaped permanent magnetic with a radial internal magnetic field and a simple coil oriented with its axis perpendicular to the axis of section 6. Alternatively, the passage of the piston could be sensed by optical or nuclear techniques. A directional source of light or nuclear energy could be mounted in the piston at its center and a photocell or nuclear particle detector could serve as a pickoff element.

Depending on the particular arrangement selected, special circuit 184 of FIG. 10 might not be necessary. In such case a simple zero-crossing detector and a pulse shaping network, e.g. a Schmitt trigger, would suffice.

The devices described could very easily be used to calibrate or prove flow transducers that do not produce digital or oscillating signal output. All that would be required is that its response be sufficiently rapid to supply sensible information during the piston passage period.

The devices also have the ability to generate the flow of fluid and act, in itself, as a flowmeter. These characteristics make it possible to be used in determining the CV factor of valves and other hydraulic elements.

What is claimed is:

1. In a system for proving the characteristic of a flowmeter the combination comprising: a conduit adapted to be connected in series with a flowmeter under test; a piston movable within a portion of the conduit; the piston having a tight fitting with the conduit so as to form a barrier in the conduit; means at one end of the portion of the conduit holding the piston; a bypass passage to permit fluid flow around the piston in its held position; means for releasing the piston from the holding means; and means for smoothly closing the bypass passage after releasing the piston.

2. The system of claim 1, in which the means for closing the bypass passage includes a rotatable annular valve having slots through it and a stationary member with slots through it coinciding with the slots of the valve, the slots of the valve rotating out of alignment with the slots of the stationary member to close the bypass passage.

3. In a system for proving the characteristic of flowmeter the combination comprising: a conduit adapted to be connected in series with a flowmeter under test; a plurality of pistons movable within a portion of the conduit, the pistons having a tight fitting with the conduit so as to form a barrier in the conduit; an upstream chamber constituting one end of the piston path of travel, the upstream chamber being sufficiently large to accommodate the plurality of pistons one behind the other and having means individual to each piston permitting fluid flow to bypass it; means for releasing each piston in turn and blocking the corresponding bypass means; and a downstream chamber constituting the other end of the piston path of travel, the downstream chamber being sufficiently large to accommodate the plurality of pistons one behind the other and having means permitting fluid flow to bypass it.

4. The combination of claim 3, in which the downstream chamber and the upstream ends of the pistons have piston stops, and the downstream ends of the pistons are shaped to impede fluid flow as the pistons approach the stops so as to trap fluid flow between the contacting surfaces of the stop and the piston and to cushion impact.

5. In a fluid system, the combination comprising: a conduit through which fluid flows; a piston designed to fit within the conduit and move with fluid flowing through the conduit; means for sensing the passage of the piston by a predetermined point, the piston sensing means generating an electrical signal that has a waveform passing through a given axis three times, the transition of one crossing being in a first direction and the transition of the other crossings being in a second direction; and means for sensing crossings having a transition in the first direction.

6. The fluid system of claim 5, in which the crossing sensing means comprises a capacitor, means for charging the capacitor with portions of the signal lying on one side of the given axis and means for applying a pulse to the capacitor only when it is charged.

7. The fluid system of claim 6, in which the means for applying a pulse to the capacitor is a Schmitt trigger and a diode connecting the output of the Schmitt trigger to the capacitor, the output of the Schmitt trigger becoming grounded upon the application to its input of portions of the signal lying on the other side of the given axis and the diode being back-biased when the capacitor is discharged.

8. Apparatus for determining the characteristic of a flowmeter comprising: a conduit for fluid flow, the conduit being adapted to communicate with a flowmeter under test; a piston located within the conduit and adapted to move through the conduit in synchronism with fluid flow as a barrier in the conduit; means for sensing the movement of the piston within the conduit; and means for propelling the piston toward a flowmeter under test to induce through the flowmeter flow of a test fluid located between the piston and the flowmeter, the propelling means being a gas under higher pressure than the test fluid located on the opposite side of the piston from the test fluid, the gas communicating with the piston under control of a fast responding valve.

9. The apparatus of claim 8, in which the means for sensing the position of the piston are at least three pickoff elements unequally spaced at intervals along the conduit.

10. The apparatus of claim 9, in which the pickoff elements are spaced at intervals increasing in distance from one end of the conduit.

11. Apparatus for determining the characteristic of a flowmeter that produces a digitized indication of the volume of fluid passing through the flowmeter comprising: a conduit for fluid flow, the conduit being adapted to accept in the path of fluid flow, a flowmeter under test; a plurality of pistons located within and movable through a portion of the conduit in synchronism with the fluid flow, each piston having two substantially identically shaped, highly coercive permanent magnets with at least one flat face and being magnetized so that the magnetic fields in them with their flat faces in contiguous relationship are parallel to and opposing each other, each piston also having a body surrounding and supporting the permanent magnets with their flat faces in contiguous relationship; first means for sensing the passage of the piston by a first point along the portion of the conduit; second means for sensing the passage of the piston by a second point along the portion of the conduit spaced a given distance from the first point; third means for sensing the passage of the piston by a third point along the portion of the conduit spaced from the second point a distance greater than the given distance; means for measuring the time interval between sensing the passage of the piston by the first point and sensing the passage of the piston by the second point; means responsive to the passage of the piston by one of the points for registering a whole number of digits produced by a flowmeter under test; means for measuring the time interval during which the whole number of digits are registered; means for latching each piston individually at one end of the conduit; a by-pass passage in the conduit to permit fluid flow around the pistons in their latched position; means for individually releasing the latching means; means after releasing the latching means for smoothly closing that portion of the by-pass passage permitting fluid flow around the released piston, and a piston stop, the stop and the piston being shaped to impede fluid flow as the piston approaches the stop and to trap fluid between the contacting surfaces of the stop and the piston, thereby cushioning impact.

12. A piston for use in measuring the volume of fluid flow in a conduit comprising two substantially identically shaped, highly coercive permanent magnets, the permanent magnets each having at least one flat face and being magnetized so that the magnetic fields in them with their flat faces in contiguous relationship are parallel to and flat faces in contiguous relationship, a piston body surrounding and supporting the permanent magnets with their flat faces in contiguous relationship; pick-off means that generate a signal having a wave form crossing a given axis three times responsive to the passage of the piston, the transition of the middle crossing being of one direction and the transition of the other crossings being of the opposite direction; and means for sensing the occurrence of a crossing having a transition of the one direction.

13. A piston for use in measuring the volume of fluid flow in a conduit comprising two substantially identically shaped, highly coercive permanent magnets, the permanent magnets each being disc-shaped, having at least one flat face, and being magnetized so that the magnetic fields in them with their flat faces in contiguous relationship are parallel to their axes and opposing each other, and a piston body surrounding and supporting the permanent magnets with their flat faces in contiguous relationship.

14. Apparatus for testing a flowmeter comprising: a conduit for fluid flow, the conduit being adapted to communicate with a fluid system including a flowmeter; a piston located within the conduit and adapted to move in synchronism with fluid flow; and a piston stop on at least one end of the path of travel of the piston within the conduit, the stop having an opening smaller than the conduit through which fluid passes to the rest of the system and an annular contact surface with the piston and the piston having a nose facing the stop of such size to impede fluid flow through the opening when protruding into the opening and an annular contact surface with the piston.

15. Apparatus for determining a flowmeter characteristic comprising: a conduit for fluid flow; a fluid barrier located within the conduit and adapted to move through the conduit in synchronism with fluid flow; a flowmeter, the characteristic of which is to be determined, connected to the conduit on one side of the barrier; a test fluid occupying the space between the barrier and the flowmeter; a source of propelling fluid connected to the conduit on the side of the barrier opposite the flowmeter, the propelling fluid being different from the test fluid; and means for introducing the propelling fluid into the conduit between the barrier and the source at a different pressure from the test fluid so as to move the barrier and induce flow of the test fluid through the flowmeter.

16. The apparatus of claim 15, in which the pressure of the propelling fluid is greater than the pressure of the test fluid so the barrier is propelled toward the flowmeter.

17. The apparatus of claim 15, in which a fast-acting valve connects the source of propelling fluid to the conduit and an escape valve connects the portion of the conduit between the barrier and the source to the atmosphere.

References Cited
UNITED STATES PATENTS

| | | | |
|---|---|---|---|
| 3,021,703 | 2/1962 | Pfrehm | 73— |
| 3,092,991 | 6/1963 | Thompson | 73— |
| 3,120,118 | 2/1964 | Boyle | 73— |
| 3,138,013 | 6/1964 | Smith | 73— |
| 3,254,523 | 6/1966 | Fisher et al. | 73— |
| 3,273,375 | 9/1966 | Howe | 73— |
| 3,295,357 | 1/1967 | Halpine et al. | 73— |
| 3,324,707 | 6/1967 | Charbonnier | 73— |

DAVID SCHONBERG, *Primary Examiner.*

NEIL B. SIEGEL, *Assistant Examiner.*